Figure 1:
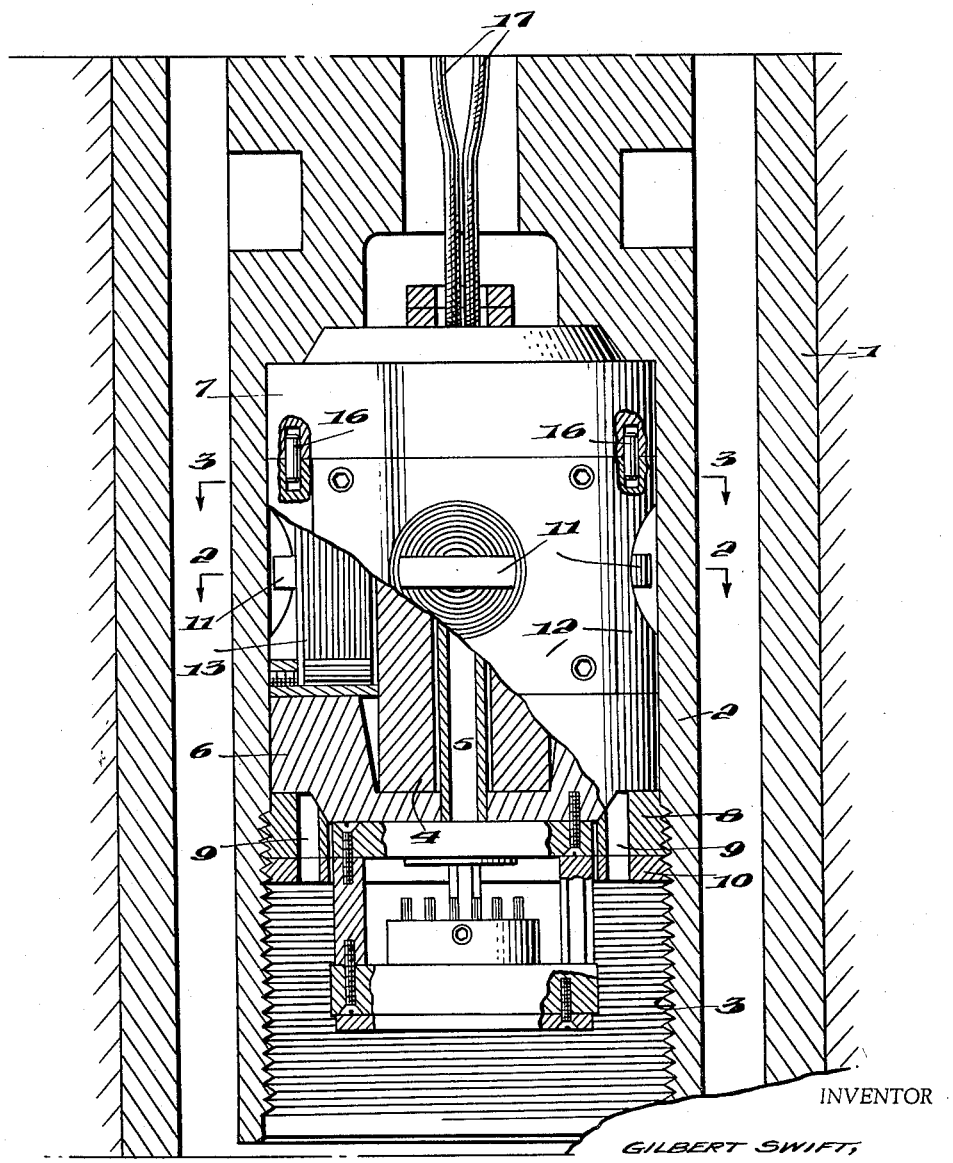

Oct. 31, 1961 G. SWIFT 3,007,109
APPARATUS FOR DETECTING CASING JOINTS
Original Filed June 1, 1954 3 Sheets-Sheet 1

INVENTOR
GILBERT SWIFT,
BY Robert K. Schumacher
ATTORNEY

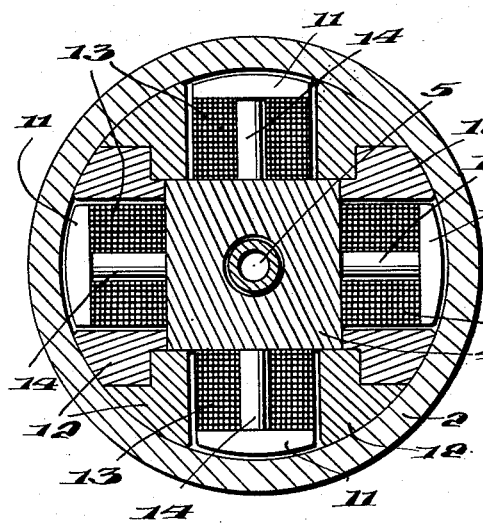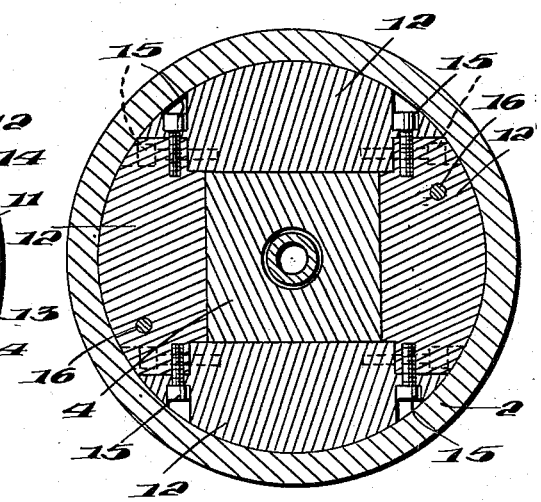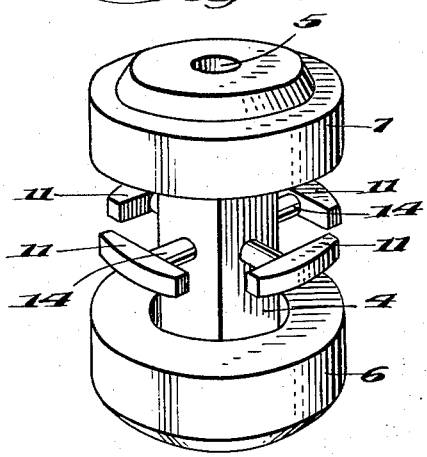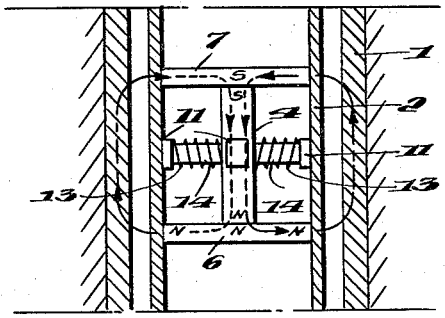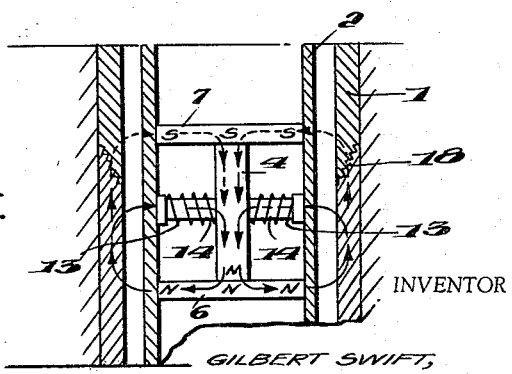
INVENTOR
GILBERT SWIFT,
BY Robert K. Schumacher
ATTORNEY " "
3,007,109
APPARATUS FOR DETECTING CASING JOINTS
Gilbert Swift, Tulsa, Okla., assignor to Well Surveys, Incorporated, a corporation of Delaware
Continuation of application Ser. No. 433,656, June 1, 1954. This application Dec. 15, 1958, Ser. No. 780,620
13 Claims. (Cl. 324—34)

This is a continuation of my copending application S.N. 433,656, filed June 1, 1954, now abandoned. This invention relates to an instrument or apparatus for locating the joints in the tubing or casing that is used to line boreholes drilled in the earth, more particularly, it relates to a novel arrangement of structure utilizing a single magnetic source of flux to achieve a greater sensitivity of signal and reliability of response than heretofore possible.

Magnetic casing collar locators are known in the prior art, and such locators usually employ a plurality of magnets as a source of magnetomotive force and have other equipment associated with the magnets to detect changes in the reluctance of the magnetic circuit as the locator passes a collar or circular discontinuity such as a joint in the casing.

The principal advantage of the casing collar locator of the present invention lies in its ability to discriminate between spurious signals and signals resulting from the instrument passing a collar or joint in the casing. Spurious signals or a spurious response may be due to bouncing of the instrument when in motion in the casing. As the instrument moves through the casing, the motion of the magnetic field of the instrument sets up a field in the casing which generates eddy currents which set up opposing fields tending to retain electrical and magnetic balance resisting any change in the system. Any change, such as changes in velocity in the longitudinal motion of the instrument in the casing generates flux and lateral motion or swinging of the instrument in the casing, modulates it, thus producing spurious signals which cannot in prior art instruments be discriminated from the signals occasioned by the flux change in the instrument as it passes a collar or joint. In the present invention the lack of sensitivity to spurious signals is due to the fact that the detecting coil or coils are located between unlike poles rather than, as in the prior art, between like poles.

It is an object of this invention to provide a casing collar locator of extreme sensitivity which does not generate false signals when it is subjected to lateral motion in the casing or to variations in longitudinal velocity in the casing.

It is another object of this invention to provide an instrument of strong mechanical design without the sacrificing of sensitivity to withstand the high pressures incurred in deep boreholes.

It is another object of this invention to provide a casing collar locator having magnetic poles for the introducing and removing of flux from a casing under normal conditions and a pickup pole intermediate said principal poles for affording a path for the flux upon either of the poles passing a discontinuity in the casing, and coil means associated with either the pickup pole or the magnet to detect said joint by the flux through said pickup pole.

It is a further object of this invention to provide a magnetic circuit that is balanced under the conditions of use since some prior art devices are balanced under static conditions but not in motion and therefore generate spurious signals.

Further and other objects will be apparent from the description in which like numerals refer to like parts.

Figure 7:
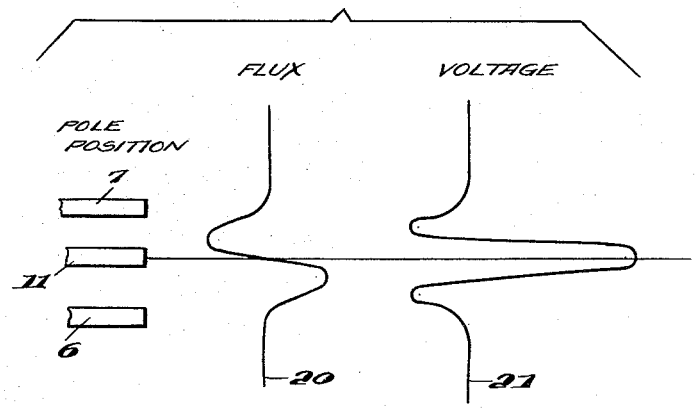
Figure 8:
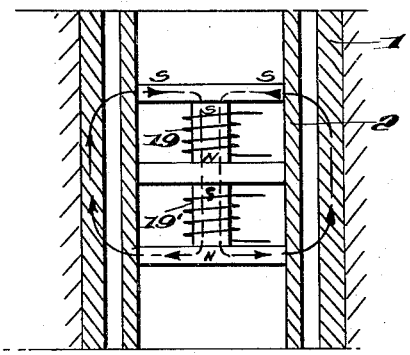
Figure 9:
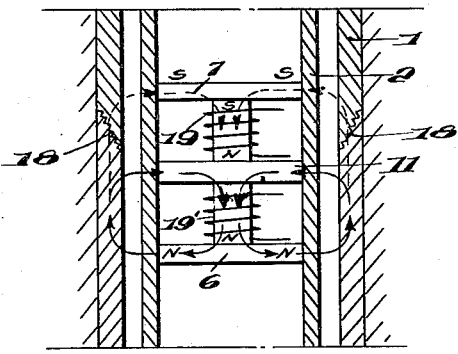

In the drawings:
FIGURE 1 is a sectional view showing the organization of parts constituting the casing collar locator;
FIGURE 2 is a sectional view taken on the line 2—2 of FIGURE 1;
FIGURE 3 is a sectional view taken on the line 3—3 of FIGURE 1;
FIGURE 4 is a partial assembly view showing the arrangement of the magnet and pole pieces and pickup poles;
FIGURE 5 is a diagrammatic view showing the normal path of flux from the pole pieces through the casing;
FIGURE 6 is a similar view to that of FIGURE 5, showing the path of flux through the pickup poles when the apparatus approaches a joint or collar;
FIGURE 7 is a diagram of the flux and voltage patterns in their relation to the poles of the instrument as they pass joints or collars in the casing; and
FIGURES 8 and 9 are diagrammatic views similar to FIGURES 5 and 6, showing the alternate arrangement of the pickup coils responding to flux through the pickup poles to produce the equivalent effect.

The apparatus herein described and illustrated is of the general type used in connection with other equipment in well logging. Once a casing is set and cemented in the borehole, a fixed relationship is established between the casing collars or joints and the formations in the earth through which the borehole was drilled. The joints or casing collars thus become permanent reference points which can be used as a basis for accurate depth measurements for future operations with respect to such borehole.

A tubular logging device is lowered into the casing or tube lining the borehole for the purposes of obtaining information about the surrounding formations, and such device will include a casing collar locator. The apparatus in the device, in addition to the casing collar locator, may include components for the purpose of detecting gamma rays and neutrons to produce on a recorder at the surface curves representing gamma rays, neutrons and collar or joint locations from which may be determined complete information about the nature of the formations around the hole and at what depth such formations occur.

The casing collar locator of this invention is shown in FIGURE 1. The casing or tube 1 shown in place in the borehole is of magnetic material such as iron or steel. Non-magnetic stainless steel housing 2 completely encloses the magnetic components of the casing collar locator. Housing 2 is formed to receive the components of the locator as will be hereinafter described, but it must be sufficiently strong to withstand high pressures encountered at great depths, as for example in oil wells. Housing 2 is provided with a threaded portion 3 to facilitate the attachment of the next section of the housing which may carry the additional equipment to obtain the logging information described above, such as gamma ray or neutron detectors.

The detector consists essentially of a magnet 4 having a centrally located passage 5 therethrough affording a passageway for wires from the other equipment to a recorder on the surface of the earth above the borehole. Soft iron pole pieces 6 and 7 are formed to receive the ends of magnet 4. Pole pieces 6 and 7 are generally circular in shape and are fitted into a recess formed within housing 2. Pole pieces 6 and 7 and magnet 4 are retained within said recess by clamp nut 8 secured in threaded portion 3 of housing 2. Lock nut 10 secures the assembly in place. Holes 9 in clamp nut 8 and lock nut 10 facilitate running said nuts into place in threaded portion 3.

As shown in FIGURE 2, pickup poles 11 are spaced around the periphery of the detector and are of soft iron or magnetic material that will form a flux path. Pickup poles 11 extend through apertures in members 12, which members surround pickup poles 11 and coils 13 to completely fill the space within housing 2 to prevent the collapse thereof under pressure. Soft iron cores 14 extend through each of coils 13 from pickup poles 11 to magnet 4 and afford an excellent path for magnetic flux.

As shown in FIGURE 3, members 12 are secured together firmly around magnet 4 by screws 15. Pins 16 orient pole pieces 6 and 7 with respect to the assembly of members 12 so that when all components are assembled there will be no relative motion between parts which might have undesirable effects on the signal and sensitivity of response of the detector.

Coils 13 are connected in series for the accumulation of the signal, and the signal is conducted to a recording instrument at the surface via leads 17.

FIGURE 4 is intended to show the arrangement of magnet 4 with pole pieces 6 and 7 together with pickup poles 11 and cores 14 arranged with respect to magnet 4 and being located intermediate pole pieces 6 and 7.

FIGURE 5 is a diagrammatic showing of the operation of the casing collar locator. The source of magnetomotive force or flux is magnet 4. Pole pieces 6 and 7 afford a path for the flux from the magnet to the inner periphery of housing 2, which is suspended within the casing 1. Housing 2 is a non-magnetic material and of relatively thin walled construction. The outer diameter of housing 2 is sufficiently close to the casing 1 so that casing 1 affords a path from one pole piece to the other to complete the flux path. Depending upon the proximity of casing 1 to pole pieces 6 and 7, the distribution of flux in the portion of the casing therebetween may be unsymmetrical around the casing, but it will be continuous through the casing and symmetrical above and below the plane of the pickup poles 11.

In the event the casing collar locator passes a collar or joint in the pipe, the flux pattern will be as shown diagrammatically in FIGURE 6. Joint 18 in the pipe or the presence of a casing collar will cause a circumferential discontinuity in the flux path through the casing and part of the flux will follow a path through pole pieces 11 and cores 14.

Since, in the absence of a circumferential discontinuity, a symmetrical or balanced magnetic circuit for the flux from the magnet is afforded through the casing as shown in FIGURE 5, no flux will pass through radial poles 11 and cores 14. However, as the instrument passes a collar or joint 18, the balance will be disturbed, and flux will pass through cores 14 and pickup poles 11 first in one direction and then in the other and in so doing induce a voltage in each of the coils for each joint or collar passed, as shown in FIGURE 7.

The accumulated signal from coils 13 is transmitted to the recorder (not shown) on the surface to register on a log with the other characteristics of the well including the surrounding formations to afford a permanent indication of depth or bench marks for future information as to that well.

FIGURE 7 shows diagrammatically the flux unbalance in the magnetic circuits and the voltage generated in the coils as poles 6 and 7 and intermediate pickup poles 11 pass a joint in the casing or pipe. In the absence of a discontinuity, a condition of balance is maintained in the magnetic circuit by reason of the uniform path for flux through the casing. However, as poles 6 and 7 approach and pass a joint in the casing, the flux pattern will be unbalanced and the flux through the pickup poles 11 will vary as shown by curve 20. The time rate of change of flux through the poles 11 generates a voltage as shown on curve 21 in the coils 13.

As shown in FIGURES 8 and 9, coils may be arranged on the magnets with their axes extending longitudinally of the casing. This arrangement of coils is the equivalent of the arrangement shown in FIGURES 5 and 6 with advantages to each arrangement. In the arrangement shown in FIGURES 5 and 6, the signal is generated by a change of flux in pickup poles 11 and cores 14 through coils 13 connected in series to accumulate the signal when flux passed through the poles 11 and cores 14 as the pickup pole has passed a joint. In the equivalent arrangement, the coils 19 and 19', are opposed or connected differentially. The net flux entering or leaving the pickup poles 11 links one or the other of these coils 19 and 19'. The flux through one coil therefore differs from the flux through the other by this net flux through poles 11. With the coils connected differentially, the net voltage is directly proportional to the rate of change of flux through poles 11 and insensitive to changes in the flux linking both coils. These are the same conditions which obtain with the radially disposed coils 13. Thus these two coil arrangements are equivalent.

The radial pole in either the system of FIGURES 5 and 6, or 8 and 9, should be located in the portion of the magnetic field which is neutral in uniform casing. The field on either side of the radial pole must be substantially the same. To the extent that this pole is displaced from the neutral position a component of flux will pass through the pickup pole when the instrument is in uniform casing. This component will vary depending on nearness to the casing and therefore spurious signals will be produced by lateral motion. The intermediate radial pole may consist of a plurality of radial poles or a single disc. The magnetomotive force may come from a single magnet extending between soft iron pole pieces or from a spool-shaped magnet or from any combination of magnets and soft iron in which the pickup poles can be placed at a neutral position between two opposite poles longitudinally spaced. It should be obvious that electromagnets could be substituted for permanent magnets.

It should be clear from the above that the essential feature is that the balance of a simple magnetic system is upset when the magnetic path through the casing becomes nonuniform and that the radial pole, intermediate the magnetic poles, then affords a path for unbalance flux. Coils may be arranged in either of two locations, on the radial poles themselves connected additively, or on the axial portion of the magnetic circuit connected differentially, to detect the unbalance of the magnetic system.

Both of the arrangements discussed above have practical applications. The arrangement shown in FIGURES 1 to 6 is very satisfactory for a large diameter instrument where there is sufficient room to get a large number of turns of wire on each radial pole. The arrangement shown in FIGURES 8 and 9 makes it possible to use the invention is a small diameter instrument where it is not possible to get large enough coils on radial poles. The coils in the latter case are placed on the axial portion of the magnetic circuit on each side of the radial pole. Since the instrument may be relatively long when the diameter is small, axial coils of considerable length can be employed in this arrangement, to achieve the desired amount of signal.

The coil arrangements above described measure rate of change of flux in the pickup poles. It is also within the scope of this invention to measure other functions of this flux. In particular, saturable magnetic transducers, such as the well-known flux gate, may be used instead of the above coils to measure flux magnitude.

It is to be understood that certain modifications, alterations and changes can be made in the practice of this invention without departing from the spirit and scope of the appended claims.

I claim:

1. A casing joint detector which comprises in combination magnet means equipped with a pair of poles of opposite polarity spaced apart longitudinally of the casing and adapted to form with the casing a magnetic circuit, additional pole means magnetically coupled to said magnet means intermediate said pair of poles disposed between said magnet means and said casing and having substantially neutral polarity when in a uniform casing, and detecting means responsive to changes of the lateral component of magnetic flux entering and leaving said intermediate pole means occasioned by a difference between the reluctance of the two portions of the casing lying respectively between the additional pole and each of the said pair of poles.

2. A casing joint detector which comprises in combination magnet means equipped with a pair of poles of opposite polarity spaced apart longitudinally of the casing and adapted to form with the casing a magnetic circuit, at least one additional pickup pole magnetically well coupled to said magnet means disposed between said magnet means and said casing substantially midway between said pair of poles in the neutral zone of the magnetic field and having substantially neutral polarity when in a uniform casing, and detecting means responsive to changes of the lateral component of magnetic flux entering and leaving said intermediate pole, indicating a difference between the reluctance of the two portions of the magnetic circuit formed by the portions of the casing lying respectively between the pickup pole and each of the said pair of poles.

3. A casing joint detector which comprises in combination magnet means equipped with north and south poles spaced apart longitudinally of the casing and adapted to form with the casing a magnetic circuit, at least one additional pickup pole magnetically well coupled to said magnet means disposed between said magnet means and said casing substantially midway between said pair of poles in the neutral zone of the magnetic field and having substantially neutral polarity when in a uniform casing, detecting means responsive to changes of the lateral component of magnetic flux entering and leaving said intermediate pole, indicating a difference between the reluctance of the two portions of the casing lying respectively between the additional pole and each of the said pair of poles, said detecting means comprising coil means for generating a signal upon the unbalance of the magnetic circuit.

4. Apparatus for detecting joints between sections of casing lining a borehole comprising a magnet means providing magnetomotive force of substantially constant magnitude between two poles of opposite polarity, pole piece means on each of said poles extending to spaced points adjacent said casing to emit and receive flux, the portions of said casing between said pole piece means at any location along said casing completing the magnetic circuit for said flux, pickup pole means extending radially from an intermediate portion of said magnet means and being positioned between said pole piece means, coil means connected to generate a signal upon flux passing radially through said intermediate pickup pole means when the normal flux path through said casing between said pole piece means is altered by a circumferential discontinuity in said casing.

5. An apparatus for detecting joints between sections of casing lining a borehole comprising a magnet providing magnetomotive force of substantially constant magnitude, said magnet extending axially of said casing, pole piece means on each end of said magnet extending transversely of said casing to emit and receive flux respectively around the periphery of said pole pieces, the portion of said casing between said pole piece means at any location completing the magnetic circuit for said flux, a plurality of pickup poles extending radially from an intermediate portion of said magnet between said pole piece means, coils surrounding said radial pickup poles connected additively to accumulate signals generated in said coils upon flux passing through said intermediate pickup poles when the normal flux path through said casing between said pole piece means is altered by a circumferential discontinuity in said casing.

6. In apparatus for detecting joints between sections of casing lining a borehole, a housing adapted to be lowered into said casing, a magnet mounted in said housing for providing magnetomotive force of substantially constant magnitude, said magnet extending axially of said casing, an annular pole piece on each end of said magnet extending transversely of said casing of a diameter such as to span a substantial portion of said casing, the portion of said casing between said pole pieces at any location completing the magnetic circuit for the flux between said pole pieces, a plurality of pickup poles extending radially from an intermediate portion of said magnet between said pole pieces, coils surrounding said radial pickup poles connected additively to accumulate signals generated in said coils upon flux passing through said intermediate pickup poles when the normal flux path through said casing between said pole pieces is altered by circumferential discontinuity in said casing.

7. In apparatus for detecting joints between sections of casing lining a borehole, a spool-shaped magnet providing magnetomotive force of substantially constant magnitude extending axially of said casing to emit and receive flux around the periphery of the poles of said magnet, the portion of said casing between said poles at any location completing the magnetic circuit for said flux, a plurality of pickup poles extending radially from an intermediate portion of said magnet between said poles of said magnet, coils surrounding said radial pickup poles connected additively to accumulate signals generated in said coils upon flux passing through said intermediate pickup poles when the normal flux path through said casing between said pole pieces is altered by a circumferential discontinuity in said casing.

8. An apparatus for detecting joints between sections of casing lining a borehole comprising a housing, a magnet mounted in a cylindrical cavity in said housing, said magnet providing magnetomotive force of substantially constant magnitude and consisting of a bar magnet extending axially of said casing, a pole piece on each end of said bar magnet extending transversely of said casing to emit and receive flux around the periphery of said pole pieces, the portion of said casing between said pole pieces at any location completing the magnetic circuit for said flux, a plurality of pickup poles extending radially to substantially the radius of said annular pole pieces from an intermediate portion of said magnet between said pole pieces, coils surrounding said radial poles connected additively to accumulate signals generated in said coils upon flux passing through said intermediate pickup poles when the normal flux path through said casing between said pole pieces is altered by a circumferential discontinuity in said casing, filler members surrounding said pickup poles and said coils formed to a cylindrical external contour to conform with said annular pole pieces, to fill said cylindrical cavity in said housing.

9. Apparatus for detecting joints between sections of casing lining a borehole comprising a housing adapted to be lowered into said casing, a magnet means mounted in said housing to provide magnetomotive force of substantially constant magnitude between two poles of opposite polarity axially spaced in said casing, pole piece means on each of said poles extending transversely of said casing to span a substantial portion of said casing, the portion of said casing between said pole piece means at any location completing the magnetic circuit for the flux between said pole piece means, pickup pole means extending radially from an intermediate portion of said magnet means between said pole piece means, coil means cooperating with said magnetic circuit connected differentially to produce a signal in said coil means only upon flux passing radially through said intermediate pickup pole means when the normal flux path through said casing between said pole piece means is altered by a circumferential discontinuity in said casing.

10. Apparatus for detecting joints between sections of casing lining a borehole comprising a housing adapted to be lowered into said casing, magnet means mounted in said housing for providing magnetomotive force of substantially constant magnitude between two poles of opposite polarity axially spaced in said casing, a pole piece on each of said poles extending transversely of said casing, the portion of said casing between said pole pieces at any location completing the magnetic circuit for the flux between said pole pieces, pickup pole means extending radially from an intermediate portion of said magnet means between said pole pieces, coils mounted on said apparatus to be linked by flux to generate a signal in said coils upon flux passing radially through said intermediate pickup pole means when the symmetry of the normal flux path through said casing between said pole pieces is disturbed due to a circumferential discontinuity in said casing.

11. A casing joint detector which comprises in combination permanent magnet means equipped with a pair of poles of opposite polarity spaced apart longitudinally of the casing and with magnetized core means between said poles and adapted to form with said casing a magnetic circuit, and means detecting a function of the lateral component of flux passing through the region which lies between said casing and said magnet means, which is between said longitudinally spaced poles, and which is substantially neutral in uniform casing, said detecting means comprising a pair of balanced coil means differentially connected and disposed between said poles on opposite sides of said region, each of said coil means comprising at least one coil wound about said core means.

12. Apparatus for detecting joints between sections of casing lining a borehole comprising a housing, a bar magnet within said housing and extending axially thereof, a pole piece on each end of said bar magnet extending transversely of said magnet to emit and receive flux around the periphery of said pole pieces, the portion of said casing between said pole pieces at any location completing the magnetic circuit for said flux, a pair of balanced coils wound about said bar magnet between said pole pieces on opposite sides of that region of said magnet neither emitting nor receiving flux when in uniform casing, means connecting the output of said coils differentially, and means for utilizing the differential output of said coils as an indication of casing joints.

13. A casing joint detector which comprises in combination permanent magnet means provided with a pair of poles of opposite polarity spaced apart longitudinally of the casing and adapted to form with said casing a magnetic circuit, said permanent magnet means having a region between said poles neither emitting nor receiving magnetic flux in uniform casing, a pair of balanced coil means disposed between said poles on opposite sides of said region, each of said coil means comprising at least one coil wound about said permanent magnet means, means connecting said coil means differentially, and means for utilizing the differential output of said coil means as an indication of casing joints.

References Cited in the file of this patent

UNITED STATES PATENTS

| | | |
|---|---|---|
| Re. 15,859 | Burrows | June 17, 1924 |
| 2,511,233 | Anderson | June 13, 1950 |
| 2,554,575 | Kurtz et al. | May 29, 1951 |
| 2,558,427 | Fagan | June 26, 1951 |
| 2,749,504 | Anderson | June 5, 1956 |
| 2,869,072 | Gieske | Jan. 13, 1959 |
| 2,892,191 | Bender | June 23, 1959 |